United States Patent [19]

Kennedy, Jr.

[11] Patent Number: 4,794,405

[45] Date of Patent: Dec. 27, 1988

[54] CIRCUIT FOR MODULATING A SCANNING BEAM IN A TEXT AND GRAPHICS IMAGE SETTING APPARATUS

[75] Inventor: John A. Kennedy, Jr., Ridge, N.Y.

[73] Assignee: Dr.-Ing. Rudolf Hell GmbH, Kiel, Fed. Rep. of Germany

[21] Appl. No.: 909,873

[22] Filed: Sep. 22, 1986

[51] Int. Cl.⁴ .............................................. G01D 9/42
[52] U.S. Cl. ........................................ 366/108; 350/6.7
[58] Field of Search ................ 346/108, 136; 358/296, 358/298; 332/7.51; 350/6.7, 6.8, 6.9, 6.91

[56] References Cited

U.S. PATENT DOCUMENTS

| | | | |
|---|---|---|---|
| 4,306,242 | 12/1981 | Jeffery | 346/108 |
| 4,482,902 | 11/1984 | Bailey et al. | 346/108 |
| 4,719,474 | 1/1988 | Hansen et al. | 346/108 |

FOREIGN PATENT DOCUMENTS 6033525 2/1985 Japan ................................ 350/6.8

Primary Examiner—E. A. Goldberg
Assistant Examiner—Huan H. Tran
Attorney, Agent, or Firm—Lawrence C. Edelman

[57] ABSTRACT

Image setting apparatus is disclosed for producing two-dimensional image on photosensitive material. The apparatus includes a device for transporting the photosensitive material past an imaging line to provide a first dimension of the two-dimensional image, a controllable source of electromagnetic radiation (EMR) for producing a modulated EMR beam, a scanning device for converting the EMR beam into a scanning beam, and a scan lens in the path of the scanning beam to focus the beam spot on the photosensitive surface. The beam spot thus moves repeatedly along the imaging line to provide the other dimension of the two-dimensional image. According to the invention, the EMR source is controlled to switch the EMR beam on and off at a frequency which is adjusted to compensate for variations in the scanning speed of the beam spot along the imaging line.

11 Claims, 4 Drawing Sheets

CIRCUIT FOR MODULATING A SCANNING BEAM IN A TEXT AND GRAPHICS IMAGE SETTING APPARATUS

CROSS-REFERENCE TO RELATED APPLICATIONS

The subject matter of the present application is related to that disclosed in the commonly-owned U.S. patent application Ser. No. 757,129, filed July 19, 1985 by Walter I. Hansen and Herbert Klepper and entitled "Text and Graphics Image Setting Apparatus", now U.S. Pat. No. 4719474.

The subject matter is also related to that disclosed in the commonly-owned U.S. patent application Ser. No. 910,368 filed Sept. 22, 1986, by John A. Kennedy, Jr. and entitled "DEVICE FOR TRANSPORTING PHOTOSENSITIVE MATERIAL PAST AN IMAGING LINE IN TEXT AND GRAPHICS IMAGE SETTING APPARATUS".

BACKGROUND OF THE INVENTION

The present invention relates to image setting apparatus for providing high quality, two-dimensional images on photosensitive material. More particularly, the present invention relates to a circuit for controlling the modulation of an electro-magnetic radiation scanning beam in apparatus of this type.

Text and graphics image setting apparatus of the type to which the present invention relates should be capable of providing two-dimensional image resolutions of up to 2400 dots per inch (dpi). Such a resolution may be achieved by scanning the surface of the photosensitive material with the focused spot of a modulated beam of electromagnetic radiation (hereinafter "EMR") such as infrared light. The EMR beam, which may be produced by a laser, is repeatedly scanned in a linear direction across the photosensitive material to provide one dimension of the two-dimensional image. The other, perpendicular image dimension is produced by repeatedly moving the photosensitive material, between or during each beam scan, in a direction perpendicular to the aforesaid beam scanning direction.

In order to obtain a uniform resolution of 2400 dpi, the scanning beam must be electronically modulated to achieve this resolution with the given scanning rate or speed of the beam spot along the imaging line. The photosensitive material must also be incremented with this resolution from scan line to scan line.

The present invention relates to a circuit which is capable of accurately controlling the modulation of the scanning EMR beam so as to achieve this, or any other, desired resolution in such a way that the resolution will be uniform.

Image setting apparatus of the aforementioned type typically includes a scan lens in the path of the scanning beam that maintains the beam spot substantially in focus on the photosensitive material at all positions along the imaging line. Such a lens, which is called an "f θ" lens, and which may be made up of a plurality of individual lens components, operates in accordance with the principles described in the U.S. Pat. No. 3,687,075 issued Aug. 29, 1972 to Seymour Rosin. Specifically, the scan lens is constructed and arranged to focus the beam in accordance with the relationship $Y' = f\theta$, where $Y'$ is the instantaneous distance of the beam spot from the intersection of the axis of the scan lens and the image plane, $f$ is the effective focal length of the lens and $\theta$ is the instantaneous angle between the scanning beam and the optical axis of the scan lens. The scan lens thus focuses the beam on the photosensitive surface while compensating for any variations in image focus introduced by deviations of the beam from the optical axis.

In image setting apparatus of this type, the scanning device for converting the EMR beam into a scanning beam is normally a mechanically rotating mirror element having one or more reflecting facets. With such an arrangement, the scanning beam reflected from the scanning mirror rotates about the point of reflection with a substantially constant angular velocity. Since this beam impinges on a planar surface, in the absence of a focusing lens, an (unfocused) beam spot would not move with a constant speed along the imaging line. In particular, the beam spot would move at greater speed at points along the imaging line that are at some distance from the optical axis than it would at those points along the imaging line immediately adjacent to the optical axis.

The f θ scan lens may be designed to somewhat compensate for variations in speed of the focused beam spot along the imaging line; however, no lens can completely or even substantially eliminate such variations in scanning speed. Accordingly, when the beam is modulated with a constant frequency in accordance with the text and/or graphics information to be layed down on the photosensitive surface, these variations in beam scanning speed result in proportionate variations in the image resolution, causing concomitant distortion of the text and/or graphics image.

It is therefore a primary object of the present invention to provide means for maintaining a uniform resolution in an image setting apparatus notwithstanding variations in the scanning speed of the beam spot along the imaging line.

SUMMARY OF THE INVENTION

The above stated object, as well as other objects which will become apparent from the discussion that follows, are achieved, according to the present invention, by providing a circuit which adjusts the frequency at which the EMR beam is switched on and off so to substantially compensate for variations in the scanning speed of the beam spot along the imaging line.

More particularly, one embodiment of the invention provides a device for producing a video clock signal having a frequency which varies in accordance with the known speed of the EMR beam spot along the imaging line, so that beam modulations (i.e., the switching of the beam on and off to produce the desired typeset image) occur at substantially equal intervals along the imaging line.

In an alternative embodiment of the present invention, the video clock signal maintains a constant frequency; however, square wave pulses are selectively removed from the video clock signal to produce an average clock rate that makes a linear approximation of the curve of accumulated error between the actual position of the beam spot and its desired position, assuming constant speed, along the imaging line.

With this second embodiment, it is advantageous if the scanning beam of the beam spot is slightly reduced. In this case, the circuit for controlling the speed of the scanning motor operates the motor at a speed which is slightly less than its full, theoretical speed of operation if the beam spot were to scan at a constant speed along the imaging line. Such reduction in the scanning motor speed linearly shifts the accumulated error curve downward so that the removal of pulses from the video clock signal more nearly approximates this error curve.

For a full understanding of the present invention, reference should now be made to the following detailed description of the preferred embodiments of the invention and to the accompanying drawings.

DESCRIPTION OF THE PREFERRED EMBODIMENTS

Figure 1:
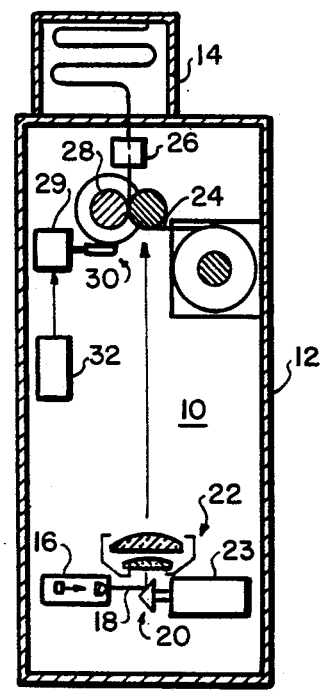
FIG. 1 is a schematic representation, shown in side view, of the principal components of phototypesetting apparatus of the type to which the present invention relates.

The preferred embodiments of the present invention will now be described with reference to FIGS. 1-9 of the drawings. Identical elements in the various figures are designated with the same reference numerals.

Figure 2:
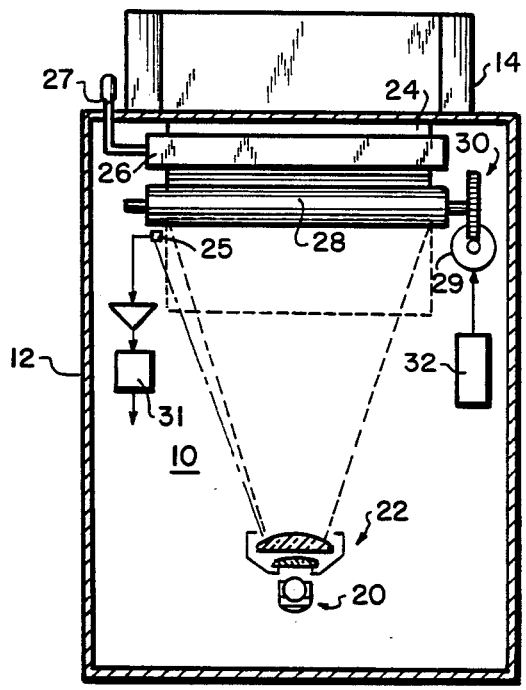
FIG. 2 is a similar depiction; that is, another schematic representation as in FIG. 1, but seen from the front.

FIGS. 1 and 2 show side and front views, respectively, of phototypesetting apparatus 10 of the type to which the present invention relates. This typesetting apparatus provides a two-dimensional image on photosensitive material from an electrical representation of this image. The apparatus 10 is enclosed in a housing 12 at the top of which there is provided a receptacle 14 for receiving the photosensitive material on which images have been set.

The housing 12 contains the mechanical and electrical components which form the image. These components include a source of electromagnetic radiation (for example, infrared light) 16 from which there is emitted a modulated beam 18. A rotatable prism mirror reflects the beam 18 toward a scan lens 22 through which the beam passes to an image point on the photosensitive material 24.

The rotatable prism mirror 20 is provided with two mirror facets that meet along a common line to form a triangular prism. The mirror or "spinner" 20 is driven by a high speed synchronous motor 23.

It will be appreciated that, as the spinner 20 is rotated, the beam passing through the scan lens 22 causes a focused spot to move in rasterlike fashion along the imaging line on the material 24. The beam angle that is swept out during imaging by a given mirror facet is approximately 60°. During this period, information contained in the modulated beam is layed down on the photosensitive material 24. It will, of course, be understood that the beam sweep caused by one facet occurs one half a revolution of the mirror 20 later than the beam sweep caused by the other facet. In between these two active periods there are dead times of approximately 120° each. During these dead times, the electronic circuitry of this system switches on the scanning beam so that the start of a scanning line can be detected by a photocell 25 and a monostable multivibrator circuit 31. At a prescribed interval following detection of the beam by the photocell 25, the scanning beam is modulated to expose the photosensitive material along the imaging line in accordance with the text and/or graphics to be produced.

Either during or after the completion of a scan line, the photosensitive material is advanced to the next scan line position by incrementing a drive roller 28 by means of a stepper motor 29 and a worm gear mechanism 30. The stepper motor is controlled by a drive circuit 32 which supplies current to the motor coils.

As the photosensitive material 24 is exposed, it is collected in the light tight chamber 14. At the completion of a run, the material is advanced further so that all of the exposed photosensitive material is transported into the chamber 14. This material is then severed by means of a cutter 26, actuated manually by a lever 27, and the chamber 14 containing the exposed material is carried to a developing station.

Figure 3:
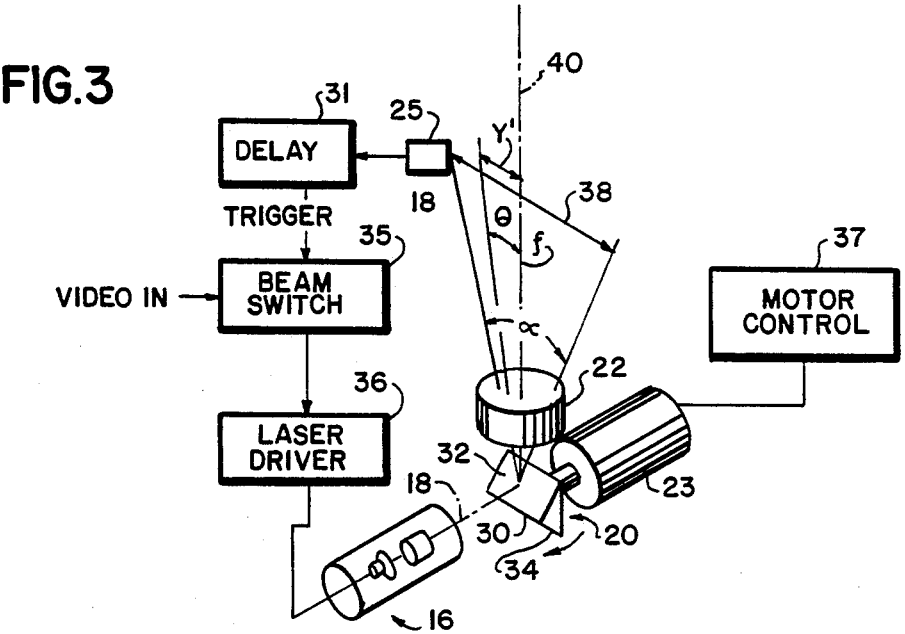
FIG. 3 is a perspective view of some of the principal components of the apparatus of FIGS. 1 and 2, particularly indicating the movements of a modulated, EMR scanning beam produced by a source and reflected by a rotating mirror through a scan lens.

FIG. 3 shows schematically some of the essential components of the apparatus. As is shown there, an infrared beam 18 generated by the laser source 16 is directed toward one facet 32 of the rotating prism mirror 20. The other facet 34 of the mirror meets the facet 32 along a common line 30 that is perpendicular to the prism axis of rotation. The mirror 20 is rotated at a constant speed by the synchronous motor 23. The speed of this motor is accurately controlled by a conventional motor control circuit 37.

The reflected beam passes through the lens 22, which focuses the beam spot on the photosensitive material (not shown) along the imaging line 38. As is indicated in FIG. 3, the scanning beam sweeps out a maximum angle $\alpha$ during imaging by a given mirror facet 32 or 34. The instantaneous position of the beam 18 is shown at an angle $\theta$ with respect to the optical axis 40 of the lens 22. With the beam at such an angle it is focused along the imaging line 38 at a distance Y' from the optical axis 40. The imaging line 38 is perpendicular to the optical axis 40 at a distance f from the scan lens 22, where f is the effective focal length of the lens.

As is described in the aforementioned U.S. Pat. No. 3,687,025 to Rosin, the scan lens 22 is constructed and arranged to focus the beam, during scanning, at all points along the imaging line 38. In particular, the lens maintains the relationship $Y' = f\theta$, thereby compensating for variations in image focus introduced by the deviations of the beam from the optical axis.

It will be appreciated, however, that notwithstanding an extremely constant rotating speed of the motor 23 and the prism mirror 20, the speed of the focused beam spot will vary as it progresses along the imaging line 38. These speed variations are introduced by the variations in distance between the mirror 20 and the different points along the imaging line 38 as well as by the lens 22 which maintains the beam in focus at the line 38.

Such speed variations for typical apparatus are illustrated by the dashed line 60 in FIG. 5. More will be said about these speed variations in the description of FIG. 5 below.

As has been indicated above, the start of a scanning line is signaled by a pulse from the photocell 25. This pulse is passed to the monostable multivibrator 31 which triggers a beam switching circuit 35 a short delay time later. The beam switch circuit, in turn, is connected to a laser drive (amplifier) 36 which supplies controlled power to the laser diode in the source 16.

The beam switching circuit 35 blanks (switches off) the laser diode during the period following receipt of a pulse from the photocell 25 until the monostable MV 31 falls back to its normal state a short time later. Following this delay, the beam switching circuit switches the laser diode on and off in accordance with the incoming video data representative of the images to be produced on the photosensitive material. The beam switching times are synchronized and controlled by a 15 MHz video clock.

Figure 4:
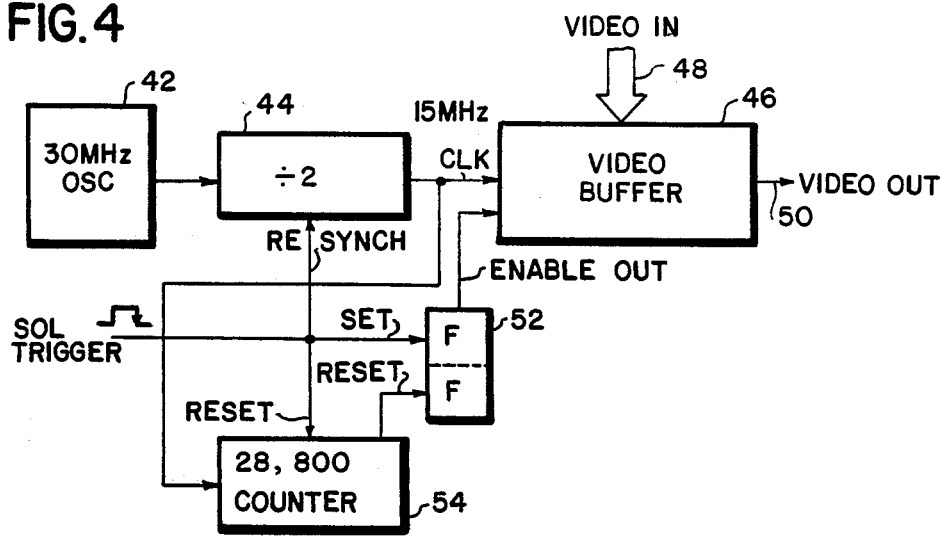
FIG. 4 is a block diagram of a beam switch circuit which operates at a constant video clock rate.

FIG. 4 shows the beam switching circuit 35 in greater detail. The circuit comprises a 30 MHz stable oscillator 42 connected to a flip-flop 44 which divides the oscillator frequency by two. The 15 MHz clock output of the flip-flop 44 is supplied to a parallel-to-serial video buffer 46 that supplies the video information, received via parallel input lines 48, to the laser driver 36 via a serial output line 50. In practice, the video buffer is external to this particular typesetting apparatus and is shown here only to convey a better understanding of the entire system.

At a maximum resolution of 2400 dpi and a scan line 12 inches in length, there will be 2400×12=28,800 dots per scan line. When operating at a frequency of 15 MHz, the image setting apparatus is capable of imaging approximately 5,000,000 dots per second or approximately 5,000 dots per millisecond due to the 33% duty cycle. At 28,800 dots per scan line, the scanning mirror is rotated at the speed required to scan each line in approximately 2 ms.

The video buffer 46 is enabled by the output of a flip-flop 52 to clock the video information out to the laser driver 36. This flip-flop is set, the divide by two circuit 44 is resynchronized, and a 28,800 counter 54 is reset by the trailing edge of an output pulse from the monostable MV 31.

Figure 5A:
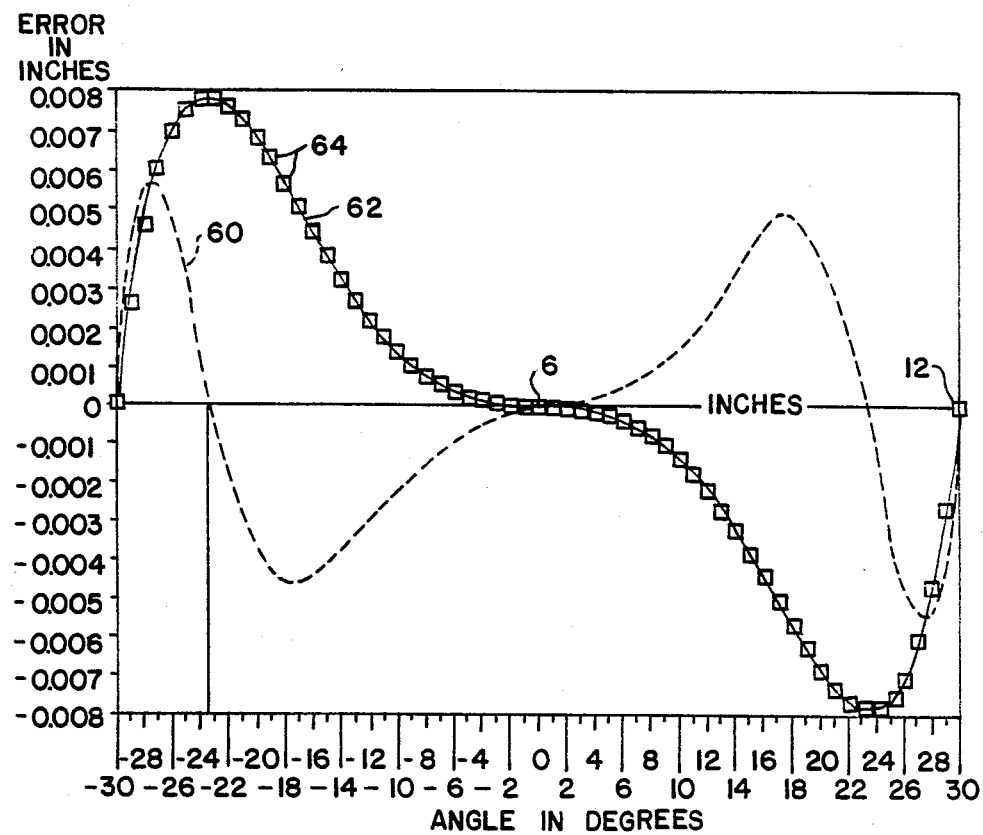
FIGS. 5A and 5B are graphs showing the beam spot speed versus position along an imaging line as well as the resultant accumulated resolution error in phototypesetting apparatus of the type illustrated in FIGS. 1-3.
Figure 5B:
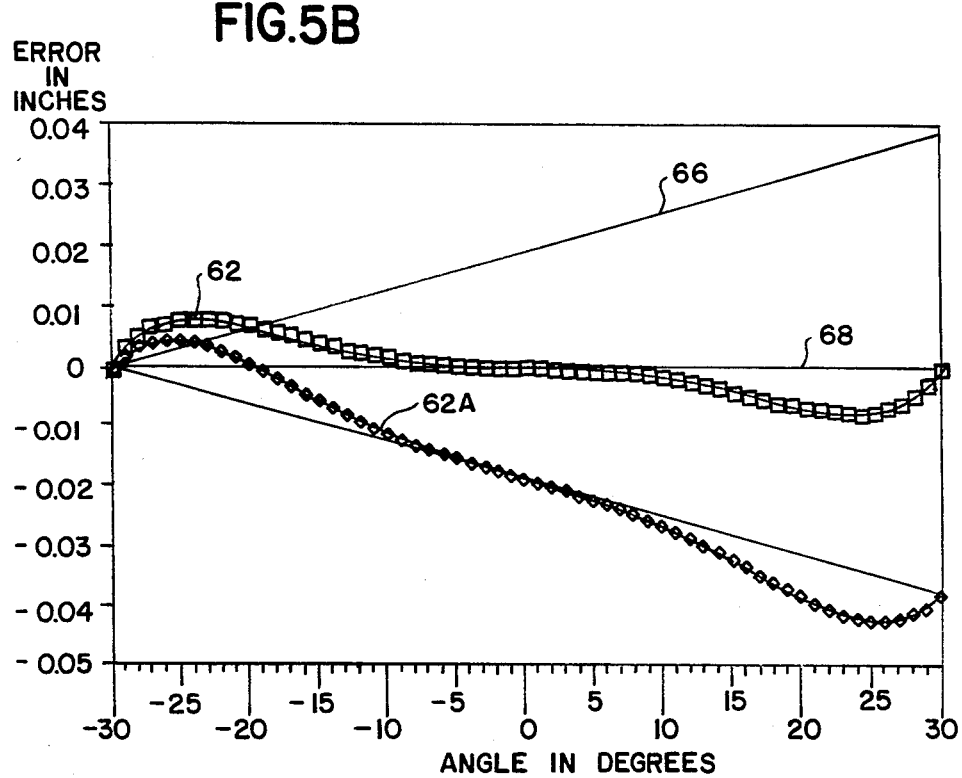

The aforementioned variations in speed of the beam spot along the imaging line 38 are illustrated in FIGS. 5A and 5B. As shown by the dashed line 60, the beam spot moves forward at the median speed at the beginning of the scan line and then rapidly accelerates to a maximum positive speed at about the 0.7 inch point along the line. Thereafter, the spot slows down until it reaches a minimum speed at approximately 2.4 inches along the scan line. The spot then increases its speed again and reaches the median speed at the mid (6 inch) point of the scan line. The speed of the beam spot along the remainder of the line is just the mirror image of its speed along the first six inches. Specifically, the spot first increases its speed to a maximum, then decreases its speed to a minimum, and finally returns to the median speed at the end of the scan line.

The accumulated error of the beam spot—that is, the difference between the actual position of the beam spot along the imaging line and its desired position, assuming a constant speed—is simply the integral of the speed curve 60. This error is indicated by the solid line 62.

Rather than calculating the error, the line 62 may be empirically determined by making actual measurements with the phototypesetting apparatus. Typical empirical results are indicated by the small squares 64.

It will be appreciated that the accumulated error represented by the curve 62 will produce variations in the image resolution if the EMR beam is switched on and off with a constant frequency. At the error maxima and minima shown in FIG. 5A, the resolution will be 24,019.2 and 23,980.8, respectively. This varation of ±19.2 dpi from the median resolution of 2400 dpi will result in measurable distortion of the typeset images. (In this connection, one thousandth of an inch is equal to 2.4 pixels at 2400 dpi. Therefore eight thousandths is equal to 19.2 pixels.)

Figure 6:
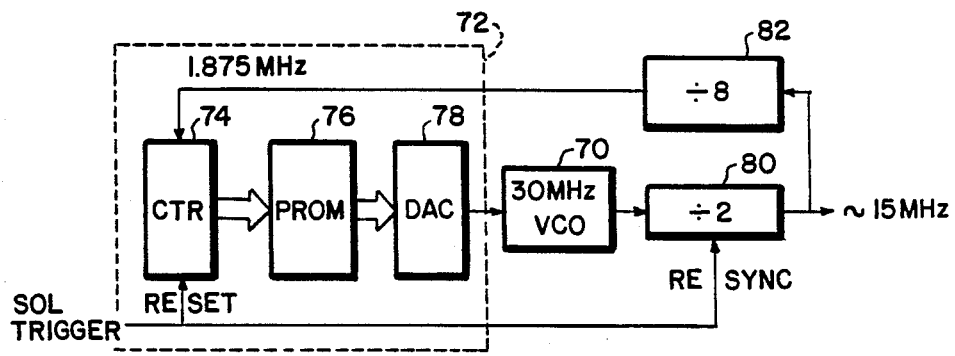
FIG. 6 is a block diagram of one embodiment of a circuit according to the present invention which is capable of correcting the video clock rate to compensate for variations in speed of the scanning beam spot.
Figure 7:
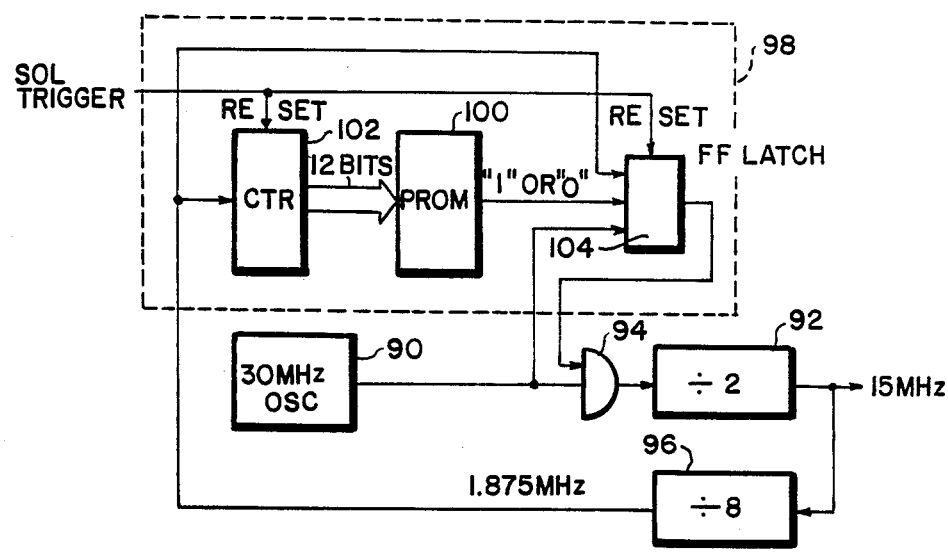
FIG. 7 is a block diagram of a second embodiment of a circuit according to the present invention which selectively eliminates pulses from the video clock signal so as to compensate for variations in speed of the scanning beam spot.
Figure 8:
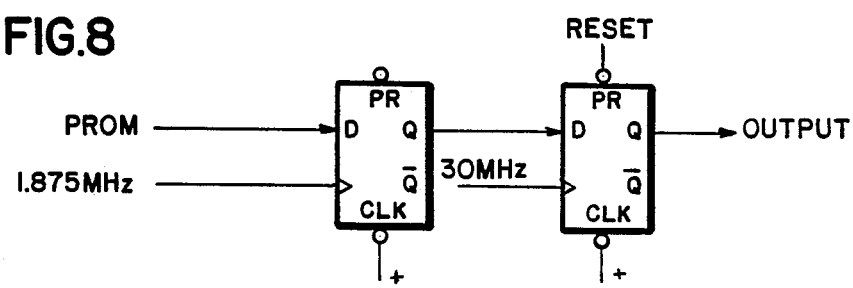
FIG. 8 is a block diagram of the flip-flop latch employed in the circuit of FIG. 7.

FIGS. 6 and 7 illustrate first and second preferred embodiments, respectively, of video clock circuits which operate to compensate for variations in the speed in the scanning beam spot along the imaging line. In the circuit of FIG. 6, the clock frequency is actually varied slightly, in dependence upon the known speed of the beam spot, so that beam modulations will occur at substantially equal intervals along the scan line. With the circuit of FIG. 7, the video clock remains at a stable 15 MHz; however, video clock pulses are selectively "removed" from the pulse stream to produce an average clock rate which approximately compensates for the aforementioned variations in speed.

The circuit of FIG. 6 employs a 30 MHz voltage controlled oscillator 70 which is capable of making rapid changes in its output frequency in response to changes in the control voltage. This control voltage is produced by a circuit 72 comprising a digital counter 74, a PROM 76 and a digital-to-analog converter (DAC) 78. The counter is reset by the trailing edge of the start of line pulse from the monostable multivibrator 31. This counter is incremented by a 1.875 MHz clock signal, and its output provides successive addresses to the PROM 76. The PROM is programmed to supply successive numbers to the DAC 78 representing the desired frequency of the VCO 70.

The output of the VCO is passed to a divide-by-two circuit 80 which is resynchronized at the beginning of each scan line. The video clock output of the circuit 80 is supplied to the video buffer (FIG. 4) to control the rate at which the scanning beam is switched on and off.

The output of the circuit 80 is also supplied to a divide-by-eight circuit 82 to generate the 1.875 MHz clock signal.

By proper programming of the PROM 76, the video clock frequency may be adjusted to closely follow the speed of the scanning beam spot along the imaging line. In this way, the beam spot will be switched on and off at substantially equal intervals along this line so as to maintain a constant resolution.

The circuit of FIG. 7 compensates for variations in the speed of the beam spot in a somewhat different way. In this circuit, pulses produced by a 30 MHz oscillator 90 are selectively passed to a divide by two circuit 92 via an AND gate 94. This AND gate disables the connection between the oscillator 90 and the circuit 92 during the period of a single 30 MHz clock pulse at a maximum frequency of 1.875 MHz (i.e., after every sixteen clock pulses produced by the oscillator 90). This maximum rate is determined by a 1.875 MHz clock signal generated from the 15 MHz video clock by a divide-by-eight circuit 96.

The inhibit/enable signal applied to the AND gate 94 is generated by a programmable circuit 98. This circuit includes a PROM 100 which is addressed by a digital counter 102. The counter 102 is reset by the start of line trigger pulse and is incremented by the 1.875 MHz clock.

The PROM 100 has 4096 addresses, with a single binary memory location at each address. The binary "1" or "0" at the location addressed is supplied to a flip-flop latch 104. This latch, which is shown in detail in FIG. 8, removes the enable signal from the AND gate 94 for a single 30 MHz clock period upon receipt of a "1" from the PROM 100.

Figure 9A:
FIGS. 9A, 9B and 9C are signal diagrams which illustrate the operation of the circuit of FIG. 7.
Figure 9B:
Figure 9C:

The operation of the circuit of FIG. 7 is illustrated by FIGS. 9A, 9B and 9C. FIG. 9A shows the 30 MHz clock signal generated by the oscillator 90. FIG. 9B shows the 15 MHz video clock signal which is derived by dividing the 30 MHz clock signal by two. FIG. 9C illustrates the output of the circuit of FIG. 7, whereby one pulse of the 15 MHz clock signal is "stretched" by an amount equal to one period of the 30 MHz clock signal.

By appropriate programming of the PROM 100, output pulses of the 15 MHz video clock can be selectively lengthened so that the accumulated error due to the decrease in modulation rate approximates the straight line 66 in FIG. 5B. Alternatively, if only the speed of the synchronous motor 23 is decreased slightly, the error curve will follow the line 62A. This slight reduction in motor speed can therefore be set into the motor control circuit 37, together with the clock pulse lengthening to produce the zero error curve 68. Variations in the image resolution over the length of the scan line are thereby substantially reduced.

There has thus been shown and described a novel scanning beam modulating circuit for a phototypesetter which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart form the spirit and scope of the invention are deemed to be covered by the invention which is limited only by the claims which follow.

What is claimed is:

1. An image setting apparatus for producing a two-dimensional image on photosensitive material, said apparatus comprising, in combination:
    (a) means for transporting said photosensitive material past an imaging line to provide a first dimension of said two-dimensional image on said photosensitive material, said imaging line extending in a direction perpendicular to the direction of transport of said photosensitive material;
    (b) a controllable source of electromagnetic radiation ("EMR") for producing a modulated EMR beam;
    (c) means for converting said EMR beam into a scanning beam;
    (d) scan lens means located in the path of said scanning beam such that a focused beam spot moves repeatedly in a linear direction across said photosensitive material on said imaging line to provide the other dimension of said two-dimensional image on said photosensitive material; and
    (e) means for controlling said EMR source to switch said EMR beam on and off in accordance with the two-dimensional image to be produced;
    the improvement wherein said source controlling means comprises means for producing a stable video clock signal and means for selectively removing pulses from said video clock signal to produce an average clock rate that makes a linear approximation of the curve of accumulated error between the actual position of said beam spot and its desired position, assuming constant speed, along said imaging line, thereby to substantially compensate for variations in the scanning speed of said beam spot along said imaging line.

2. Apparatus as defined in claim 1, wherein said transporting means comprises at least one driving roller in contact with said photosensitive material and a stepper motor mechanically coupled to rotate said driving roller.

3. Apparatus as defined in claim 2, wherein said stepper motor is coupled to rotate said driving roller by a gear reducing worm gear drive.

4. Apparatus as defined in claim 1, wherein said EMR source comprises a laser which emits a coherent EMR beam.

5. Apparatus as defined in claim 4, wherein said laser is a semiconductor infrared laser.

6. Apparatus as defined in claim 1, wherein said converting means includes a rotatable optical element, having at least one mirrored surface, for reflecting said EMR beam into a scanning beam with a substantially constant angular velocity.

7. Apparatus as defined in claim 6, wherein said rotatable optical element has two mirrored facets whose planes interesect in a common line which is perpendicular to the mirror axis of rotation.

8. Apparatus as defined in claim 7, wherein said axis of rotation is parallel to said EMR beam produced by said EMR source.

9. Apparatus as defined in claim 1, wherein said scan lens means is constructed and arranged to adjust said scanning beam according to the relationship $Y'=f\,\theta$, where $Y'$ is the distance of the image from the intersection of the axis of the scan lens and the image plane, f is the effective focal length of the scan lens to the image plane, and $\theta$ is the angle between the collimated beam and the optical axis of the scan lens, thereby to focus said scanning beam onto the photosensitive material at the image plane while compensating for any variations in image focus introduced by deviation of the focused beam from the optical axis.

10. Apparatus as defined in claim 4, wherein said EMR source controlling means includes laser driver means coupled to said laser, for controlling the amount of electrical power supplied to said laser so as to maintain constant brightness of said beam spot along said imaging line.

11. Apparatus as defined in claim 1, wherein said converting means comprises a rotatable optical element, having at least one mirrored surface, a synchronous motor mechanically coupled to rotate said optical element, and circuit means, coupled to said synchronous motor, for controlling the speed of said motor, said motor being operated at a speed which is slightly less than its full theoretical speed of operation if said beam spot were to scan at a constant speed along said imaging line, thereby to linearly shift said accumulated error curve to permit closer approximation of said curve by said average clock rate.

* * * * *